United States Patent [19]

Sebo

[11] 3,902,764

[45] Sept. 2, 1975

[54] ADAPTIVE BRAKING MODULATOR

[75] Inventor: Milan J. Sebo, Elyria, Ohio

[73] Assignee: The Bendix Corporation, South Bend, Ind.

[22] Filed: Apr. 22, 1974

[21] Appl. No.: 462,690

[52] U.S. Cl.................. 303/21 F; 303/40; 303/68
[51] Int. Cl.²................ B60T 8/06; B60T 15/02
[58] Field of Search.............. 303/21 F, 61–63, 303/68–69, 40; 188/181 A, 181 R; 137/627.5

[56] References Cited
UNITED STATES PATENTS

| | | | |
|---|---|---|---|
| 3,758,167 | 9/1973 | Machek | 303/21 F X |
| 3,767,271 | 10/1973 | Grosseau | 303/21 F |
| 3,768,519 | 10/1973 | Morse | 303/21 F X |
| 3,801,161 | 4/1974 | Sharp | 303/21 F |
| 3,820,856 | 6/1974 | Adahan | 303/21 F |
| 3,823,987 | 7/1974 | Kurichh | 303/21 F |
| 3,854,501 | 12/1974 | Machek | 303/21 F |
| 3,857,614 | 12/1974 | Kurichh | 303/21 F |

*Primary Examiner*—Trygve M. Blix
*Assistant Examiner*—Douglas C. Butler
*Attorney, Agent, or Firm*—Ken C. Decker; William N. Antonis

[57] ABSTRACT

An adaptive braking system is provided with a brake pressure modulating valve which is responsive to output signals generated by an electronic control unit to control braking pressure communicated to the brakes of the vehicle when an incipient skidding condition exists. The modulator is responsive to the output signals to decay braking pressure, and upon termination of the incipient skidding condition the modulator permits braking pressure to increase. The modulator includes a device responsive to the initial signal generated by the electronic controller to restrict communication into the modulator to a predetermined rate, thereby limiting subsequent pressure increase to the predetermined rate. The modulator further permits the brake pressure to increase during a build cycle at a first predetermined rate until a first pressure level is attained and thereafter permits braking pressure to increase at a lesser rate until either the line pressure is attained or the electronic control unit generates another output signal.

7 Claims, 2 Drawing Figures

ADAPTIVE BRAKING MODULATOR

BACKGROUND OF THE INVENTION

This invention relates to a brake pressure modulator for a vehicle adaptive braking system.

Adaptive braking systems are expected to be required on air-braked vehicles in the near future. This type of braking system includes an electronic control unit which is responsive to the angular velocity of the vehicle wheel controlled by the system to generate a control signal whenever an incipient skidding condition exists. A modulator must be provided which is responsive to the control signal to effect a brake pressure reduction when an incipient skidding condition exists, and which thereafter permits braking pressure to increase upon termination of the incipients skidding condition.

SUMMARY OF THE INVENTION

Therefore an important object of my invention is to provide an adaptive braking modulator which, during a normal brake application, permits substantially uninhibited actuation of the brakes of the vehicle, but after initial intervention by the vehicle adaptive braking system, limits the subsequent rate of brake pressure increase until the brake application is manually terminated.

Another important object of my invention is to provide a brake pressure modulator which decreases the braking pressure at a predetermined rate when an incipient skidding condition is sensed, and which rebuilds the braking pressure at a first predetermined rate until a certain pressure level is attained after which the modulator permits braking pressure to increase at a lesser rate.

Still another important object of my invention is to reduce the application and release rate of braking pressure during control of the brakes by the adaptive braking system so that the braking forces may be optimized.

Still another important object of my invention is to provide an adaptive braking modulator which controls the brake pressure apply and release rate during adaptive control of the vehicle's brakes so that the electronic control can better sense changes in braking efficiency.

DETAILED DESCRIPTION

Figure 1:
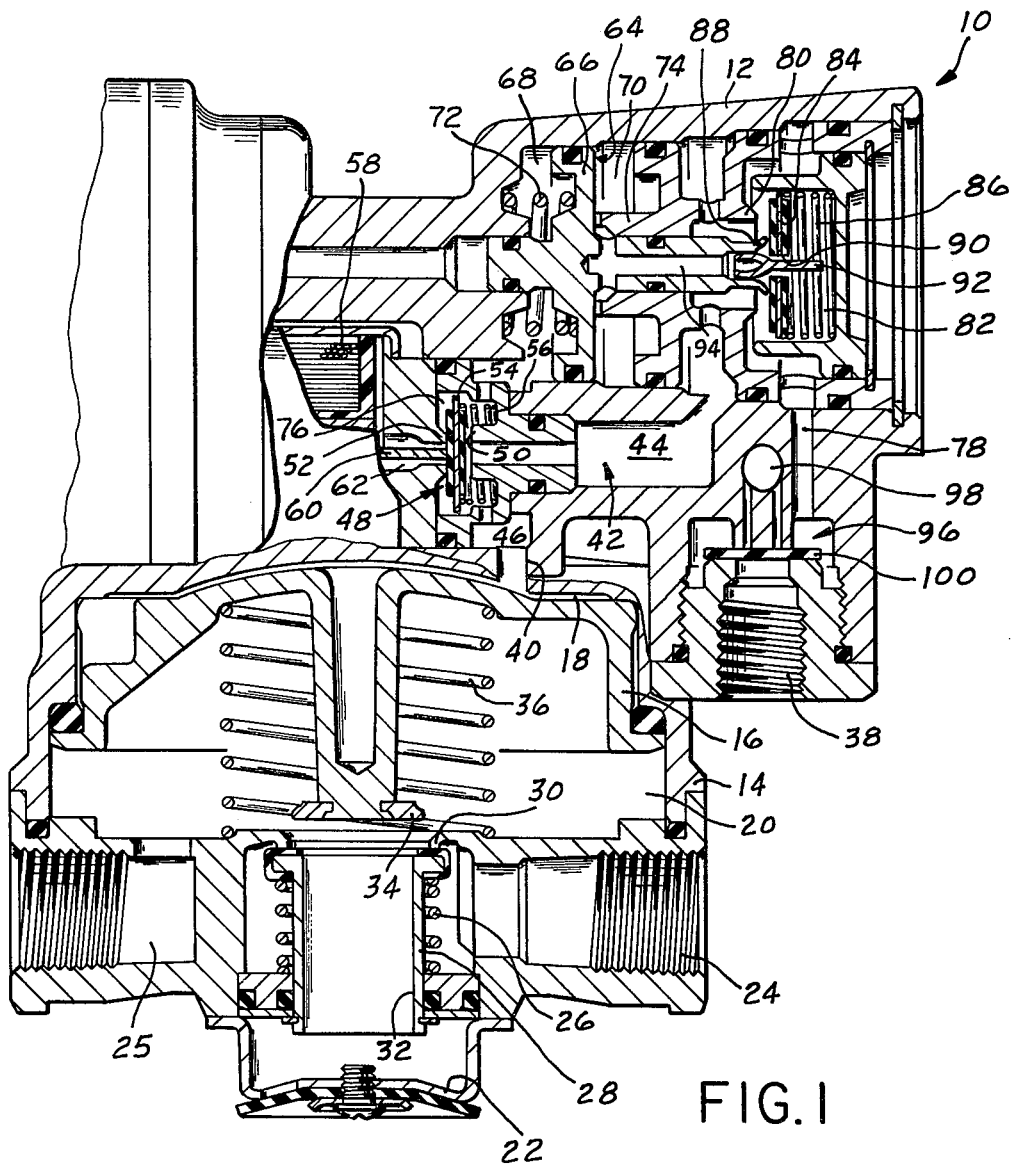
FIG. 1 is a fragmentary, transverse cross-sectional view of a combination brake pressure modulator and relay valve made pursuant to the teachings of my present invention.

Referring now to the Drawing, a combined adaptive braking modulator and relay valve generally indicated by the numeral 10 includes a modulator housing 12 and a relay valve housing 14. The relay valve housing 14 is of a conventional type which has been widely used in automotive air brake systems for many years. A relay piston 16 is slidable within the housing 14 and cooperates with the wall of the housing to define a primary chamber 18 and a secondary chamber 20 therewithin. The secondary chamber 20 is communicated to the brakes of the vehicle (not shown) through outlet port 25 and also to atmosphere through exhaust port 22.

Inlet port 24 is communicated with a source of relatively high pressure air, as the function of the relay valve is to control communication of this high pressure air to the vehicle brake actuators. A spring 26 yieldably urges an exhaust valve 28 into sealing engagement with a valve seat 30 to thereby prevent communication from the inlet port 24 into the secondary chamber 20. However, secondary chamber 20 is communicated to the exhaust port 22 through the passage 32 within the valve member 28. Another valve member 34 is carried on the piston 16, and a spring 36 yieldably urges the piston 16 toward the position illustrated in the drawing thereby urging valve member 34 away from member 28. It will be appreciated that upon increase of the fluid pressure level in the primary chamber 18 above that required to overcome the force of the spring 36, the piston 16 will be urged downwardly viewing the drawing until the valve member 34 sealingly engages the valve member 28 to thereby terminate the communication between the second chamber 20 and the exhaust port 22. Thereafter, further downward movement of the relay piston 16 will urge the valve member 28 away from the seat 30, to thereby communicate the high pressure fluid in the inlet port 24 into the secondary chamber 20, outlet 25, and to the vehicle brake actuators.

The modulator housing 12 includes an inlet 38 which is connected to the vehicle brake valve (not shown) which, when a brake application is effected, communicates high pressure fluid to the inlet 38. An outlet 40 on the housing 12 communicates with the primary section 18 of the relay valve housing 14. The housing 12 defines a chamber 42 therewithin divided into an inlet section 44 communicated with the inlet 38 and the outlet section 46 communicated to the outlet 40 by electrically actuated valve means generally indicated by the numeral 48. The electrically operated valve means 48 includes a first valve seat 50, a second valve seat 52 opposite the valve seat 50, and a valve member 54 which is disposed in the compartment 76 between the valve seats 50 and 52 and which is yieldably urged into sealing engagement with the valve seat 52 by a spring 56. Therefore, uninhibited fluid communication is normally permitted between the inlet section 44 and the outlet section 46. Electrically operated valve means 48 further includes a solenoid 58 which has a plunger 60 extending through a passage 62 and the valve seat 52. The passage 62 communicates with an atmospheric vent (not shown), and the size of the plunger 60 in proportion to the size of the passage 62 is such that restricted fluid communication is permitted through the passage 62 whenever the solenoid is actuated to move the valve member 54 away from the valve seat 52. Therefore, upon actuation of the solenoid 58, the valve member 54 will be urged out of sealing engagement with the valve seat 52 and into sealing engagement with the valve seat 50.

The housing 12 further defines another pressure chamber 64 therewithin. A differential pressure responsive piston 66 is slidably mounted in the chamber 64, and one face of the piston 66 cooperates with the wall of the housing 12 to define a first fluid section 68 therebetween, and the other face of the piston 66 cooperates with another portion of the housing 12 to define a second section 70 therebetween. The spring 72 yieldably urges the piston 66 into engagement with a piston stop 74, which is integral with the housing 12, and which also slidably supports the piston 66 for reciprocable movement within the housing 12. The areas of the piston 66 which are exposed to the fluid pressure level in the sections 68 and 70 are designed such that they are substantially equal so that, when equal pressures are communicated into the sections 68 and 70, a very light spring 72 is sufficient to urge the piston into engagement with the piston stop 74. The section 68 is communicated to the valve chamber 76 defined between the valve seats 50 and 52 in which the valve member 54 is disposed.

A flow path 78 communicates the inlet 38 with chamber 42. The flow path 78 extends through a valve seat 80 and a compartment 82. A valve member 84 is slidably disclosed in the compartment 82 and a spring 86 yieldably urges the valve member 84 toward the valve seat 80. However, the end 88 of the piston 66 engages the valve member 84 when the piston 66 is urged against the piston stop 74. Consequently, the valve member 84 is held away from the valve seat 80 when the piston is disposed in the position illustrated in the drawing. An opening 90 is defined centrally within the valve member 84, and an orifice pin 92 carried by the piston 66 extends through opening 90 and cooperates with the latter to permit fluid communication therethrough at sOme limited maximum rate. A passage 94 extends through the piston 66 and the stop member 74 to communicate section 70 of chamber 64 with the opening 90.

A quick release valve generally indicated by the numeral 96 is provided to quickly vent the modulator housing 12 upon manual release of the brake application. The quick release valve 96 includes an atmospheric port 98 and a diaphragm 100. When pressure to the inlet port 38 is greater than the pressure within the housing 12, the diaphragm 100 is forced into sealing engagement with the housing 12 to prevent communication to the atmospheric port 98. The edges of the diaphragm 100 then deflect to permit communication from inlet 38 into the flow path 78. However, when the pressure at inlet port 38 is reduced below that of the pressure in the housing 12, the higher the pressure fluid in the housing forces the diaphragm 100 away from the passages communicating to the vent 98, thereby permitting the quick release of pressure in the housing 12.

MODE OF OPERATION

Various components of the modulator and relay valve are illustrated in positions which they assume when the brakes of the vehicle are released. When a brake application is effected, high pressure fluid is communicated to the inlet 38 and is communicated directly into the primary chamber 18 through the flow path 78, inlet section 44, the valve chamber 76, and the outlet chamber 46. Fluid pressure in the primary chamber 18 then actuates the relay valve in the normal manner to effect an application of the brakes of the vehicle. At the same time, pressure communicates from inlet 38 into section 70 at a rate governed by the size of orifice 90 and pin 92. Since communication into chamber 70 is restricted, piston 66 cannot be actuated accidentally by a transient pressure differential across the piston.

Figure 2:
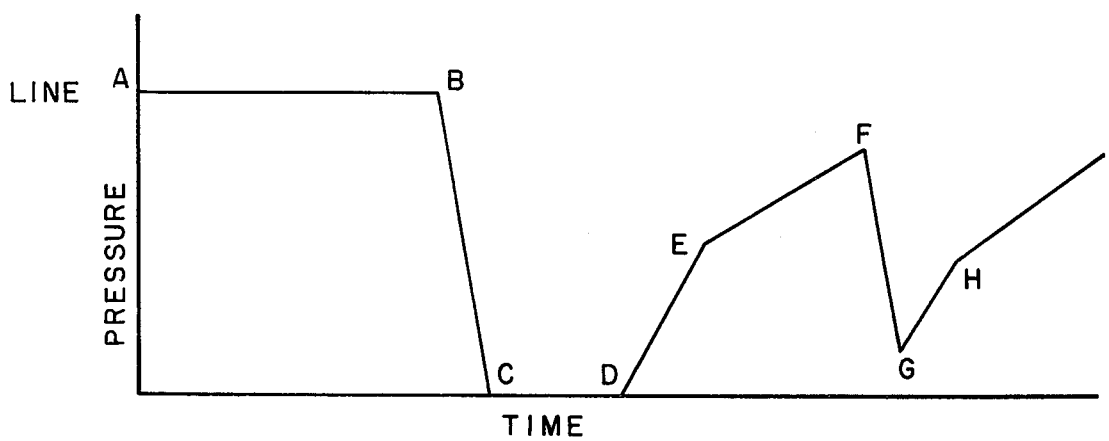
FIG. 2 is a graphical presentation of the operation of the controller illustrated in FIG. 1 during control of the brakes of the vehicle by the adaptive braking system.

Assuming that a constant pressure level is established at the inlet 38 at all times during operation of the device, operation of the modulator and relay valve 10 prior to the intervention of the adaptive braking system is represented by line A–B in FIG. 2. At point B of FIG. 2, the aforementioned electronic control unit (not shown) senses an incipient skidding condition of one of the controlled wheels, and generates an output signal actuating the solenoid 58. When this occurs, the valve member 54 is urged away from the valve seat 52 and into sealing engagement with the valve seat 50. Therefore, the fluid pressure level in the outlet section 46 and in the primary chamber 18 of the relay valve is vented to atmosphere at a controlled rate established by the size of the passages 62 relative to the size of the plunger 60. This venting of the chamber 18 is illustrated graphically by line B–C in FIG. 2. Although FIG. 2 illustrates an incipient skidding condition of a severity great enough to require that the pressure in the primary chamber 18 drop to zero, it must be understood that the incipient skidding condition may terminate at some pressure level less than zero. The reduced pressure in the primary chamber 18 causes the relay valve to correspondingly reduce pressure in the brake actuators (not shown).

Since the section 68 of chamber 64 is communicated into the valve chamber 76, movement of the valve member 54 away from the valve seat 52 will also vent the section 68. When this occurs, the higher fluid pressure level in the section 70 urges the piston 66 to the left, viewing FIG. 1, thereby permitting the spring 86 to urge the valve member 84 into sealing engagement with the valve seat 80, to thereby restrict fluid communication through the flow path 78 into the inlet section 44 to a rate governed by the size of the opening 90 and the size of the orifice pin 92. It will also be noted that, although the fluid pressure in the sections 68, 46, and 76 is vented during the initial adaptive braking cycle, the pressure level in the inlet section 44 remains substantially that of line pressure at the inlet 38. When the electronic control unit senses that an incipient skidding condition no longer exists, the signal to the solenoid 58 is terminated, thereby permitting the spring 56 to drive the valve member 54 away from the valve seat 50 and back into engagement with the valve seat 52. When this occurs, the relatively high pressure level in the inlet section 44 is communicated into the primary section 18, and these pressures equalize at some value less than the pressure in the inlet section 44 prior to release of the solenoid 58. Since the total volume of the chambers 18, 46, 76 and 68 is substantially greater than that of the inlet section 44, the pressure in the primary chamber 18 will increase at some predetermined rate, as represented by line D–E in FIG. 2. At point E in FIG. 2, the pressure levels across the valve seat 50 have equalized, and thereafter pressure is communicated into the primary chamber 18 in a rate governed by the size of the orifice 90 and the orifice pin 92 which controls communication through the flow path 78. This state is represented by line E–F in FIG. 2. It should be noted that during the entire build cycle D–E–F, the valve member 84 remains in sealing engagement with the valve seat 80, since the pressure level in the chamber 68 is less than that in the chamber 70. At point F, the electronic control unit again senses an incipient skidding condition and actuates the solenoid 50 to again vent the primary chamber 18, as represented by line F–G in FIG. 2. At point G, the electronic control unit senses that an incipient skidding condition no longer exists. As illustrated in FIG. 2, point G occurs at some pressure level above zero pressure, but, according to the circumstances, the brake pressure decay may again reach zero pressure level if the skidding condition is exceptionally severe. During this second brake pressure decay cycle, the pressure level in the inlet section 44 is increasing at the predetermined rate established by the size of the opening 90 and the orifice pin 92. While it is possible, if the decay cycle lasts for a sufficiently long time, that the pressure level in the inlet section 44 might again increase to line pressure, it is more likely that the pressure level in inlet section 44 will be at a value somewhat less than line pressure when the incipient skidding terminates. Therefore, when the spring 56 urges the valve member 54 away from the valve seat 50 upon termination of the decay cycle at point G in FIG. 2, the pressures in inlet section 44 and in the primary chamber 18 will equalize at a value H, which is somewhat less than the value E which was attained during the first build cycle. This occurs because of the lower pressure level in inlet section 44 when the build cycle is initiated at point G. Beginning at point H, pressure increases at the rate established by the size of the opening 90 in orifice pin 92, until another incipient skidding condition is sensed. The modulating valve continues to function in this manner until the vehicle is brought to a stop and the pressure level in the inlet port 38 is reduced, thereby venting the interior of the housing 12 and permitting the various components to return to the position illustrated in the FIG. 1. It will be noted that after the adaptive braking brake cycle is initiated at point B in FIG. 2, the valve member 84 remains engaged with valve seat 80 until the brake application is terminated, regardless of whether the pressure in the primary chamber 18 is increasing, decreasing, or remaining constant. Therefore, the rate of fluid pressure communication into the primary chamber 18 is limited by the size of the opening 90 and the orifice pin 92 during operation of the vehicle's brakes by the adaptive braking system. Of course, when adaptive control is not needed, it would be very dangerous to so limit the rate of brake pressure communication into the relay valve, as this would impair braking effectiveness. For this reason, the rate of fluid communication into the section 70 through the passage 94 is limited by the size of the opening 90 and the size of orifice pin 92, so that transient conditions which exist when the brakes of the vehicle are applied initially cannot result in a higher pressure level occurring in the pressure chamber 70 than that occurring in the chamber 68, because of the longer flow path required to communicate pressure into the chamber 68.

I claim:

1. In an adaptive braking modulator for a vehicle braking system:
   a housing defining a chamber therewithin, said housing having an inlet communicated to a fluid pressure source and to said chamber, an outlet communicated to said chamber and to brake-application effecting means, and a vent communicated to said chamber;
   electrically actuated valve means in said chamber dividing the latter into an inlet section communicated to said inlet and an outlet section communicated to said outlet, said valve means normally communicating the inlet and outlet sections and preventing communication from either of said sections to said vent, said valve means being actuable to an actuated condition to terminate communication between the inlet and outlet sections and to initiate communication between said outlet section and said vent; and
   means responsive to actuation of said electrically actuated valve means and to the fluid pressure level at the inlet for restricting communication into said inlet section when the electrically actuated valve means is initially actuated and maintaining said restricting of communication until the fluid pressure level at said inlet drops below a predetermined level;
   said restricting means including a pressure differential responsive piston, opposite sides of said pressure differential responsive piston being initially communicated to the fluid pressure level at the inlet, and flow restricting valve means responsive to movement of the pressure differential responsive piston to shift from an initial position permitting substantially uninhibited fluid communication into said chamber to an actuated position restricting communication into said chamber, said electrically actuated valve means in said actuated condition communicating one side of said piston to said vent to thereby permit the pressure acting on the other side of the piston to move said piston causing said flow restricting valve means to move to its actuated position.

2. The invention of claim 1:
   said flow restricting valve means including an orifice, said orifice being interposed between the inlet and the chamber when the flow restricting valve means is moved to its actuated condition.

3. The invention of claim 2:
   said flow restricting valve means including a valve seat interposed between said inlet and said chamber, a valve member for engagement with said seat, said orifice being defined in said valve member, said piston holding said valve member away from said valve seat when the flow restricting valve means is in the neutral position, said valve member engaging said valve seat when the piston is moved to the actuated condition.

4. The invention of claim 3:
   said restricting means including first passage means defined at least in part by said chamber, said first passage means communicating said inlet with one face of the piston so that the fluid communicated to said one face is vented when the electrically actuated valve means is shifted to the actuated condition, and second passage means communicating the other face of the piston with said inlet.

5. The invention of claim 4:
   said second passage means extending through said orifice when the piston is disposed in said initial condition whereby communication to said other face of the piston is restricted to prevent inadvertent actuation of the piston by transient pressure levels within said housing.

6. The invention of claim 5:
   one end of said piston engaging said valve member when the piston is disposed in the initial condition, said second passage means being defined in part by a bore defined within said piston, said inlet communicating with the bore defined within the piston through said orifice.

7. The invention of claim 1:
   said restricting means including first passage means defined at least in part by said chamber, said first passage means communicating said inlet with one face of the piston so that the fluid communicated to said one face is vented when the electrically actuated valve means is shifted to the actuated condition, and second passage means communicating the other face of the piston with said inlet.

* * * * *